US008063887B2

(12) United States Patent
Barrus et al.

(10) Patent No.: US 8,063,887 B2
(45) Date of Patent: Nov. 22, 2011

(54) THIN MULTIPLE LAYER INPUT/OUTPUT DEVICE

(75) Inventors: John W. Barrus, Menlo Park, CA (US); Ken Gudan, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 964 days.

(21) Appl. No.: 11/673,324

(22) Filed: Feb. 9, 2007

(65) Prior Publication Data
US 2008/0192013 A1     Aug. 14, 2008

(51) Int. Cl.
*G09G 5/00* (2006.01)
*G06F 3/041* (2006.01)

(52) U.S. Cl. ................. 345/173; 345/1.1; 345/156

(58) Field of Classification Search .......... 345/156, 345/173–184, 169
See application file for complete search history.

(56) References Cited

U.S. PATENT DOCUMENTS

| | | | | |
|---|---|---|---|---|
| 5,729,202 A * | 3/1998 | Klaehn | ........ | 340/572.4 |
| 6,961,105 B2 * | 11/2005 | Chang et al. | ........ | 349/114 |
| 7,161,590 B2 * | 1/2007 | Daniels | ........ | 345/204 |
| 7,205,959 B2 * | 4/2007 | Henriksson | ........ | 345/4 |
| 7,330,178 B2 * | 2/2008 | Yorio et al. | ........ | 345/169 |
| 7,589,714 B2 * | 9/2009 | Funaki | ........ | 345/173 |
| 7,688,315 B1 * | 3/2010 | Gettemy et al. | ........ | 345/174 |
| 7,724,208 B1 * | 5/2010 | Engel et al. | ........ | 345/4 |
| 2003/0003956 A1 * | 1/2003 | Maenpaa et al. | ........ | 455/556 |
| 2004/0196255 A1 * | 10/2004 | Cheng | ........ | 345/104 |
| 2006/0290651 A1 * | 12/2006 | Verhaegh et al. | ........ | 345/107 |

OTHER PUBLICATIONS

"Mobile multilayer displays" and "Dual ZIP adapter board", Information DISPLAY, May/Jun. 2007, p. 59, vol. 23, Nos. 5 & 6.

* cited by examiner

*Primary Examiner* — Duc Dinh
(74) *Attorney, Agent, or Firm* — Patent Law Works LLP (57) ABSTRACT

A multilayer input/output device with a low power and a high resolution display suitable for use in paper-like computing includes a first display layer, a second display layer, an input layer and control logic. The first display layer is a low power display. The second display layer is a fast, transparent display positioned on top of the first layer. The input layer is a layer for detecting input movements or gestures by the user. The control logic is coupled to the first display layer, the second display layer and the input layer for controlling their operation according the method of the present invention. The method of the present invention selectively operates the second display layer to present movement detected by the input layer. At a predetermined time, the information presented on the second display is transferred to and presented on the first display.

22 Claims, 8 Drawing Sheets

THIN MULTIPLE LAYER INPUT/OUTPUT DEVICE

BACKGROUND OF THE INVENTION

The present invention relates to input/output devices. More particularly, the present invention relates to input/output devices for paper-like computing. Still more particularly, the present invention relates to a low power, high resolution display for paper-like computing.

Figure 1:
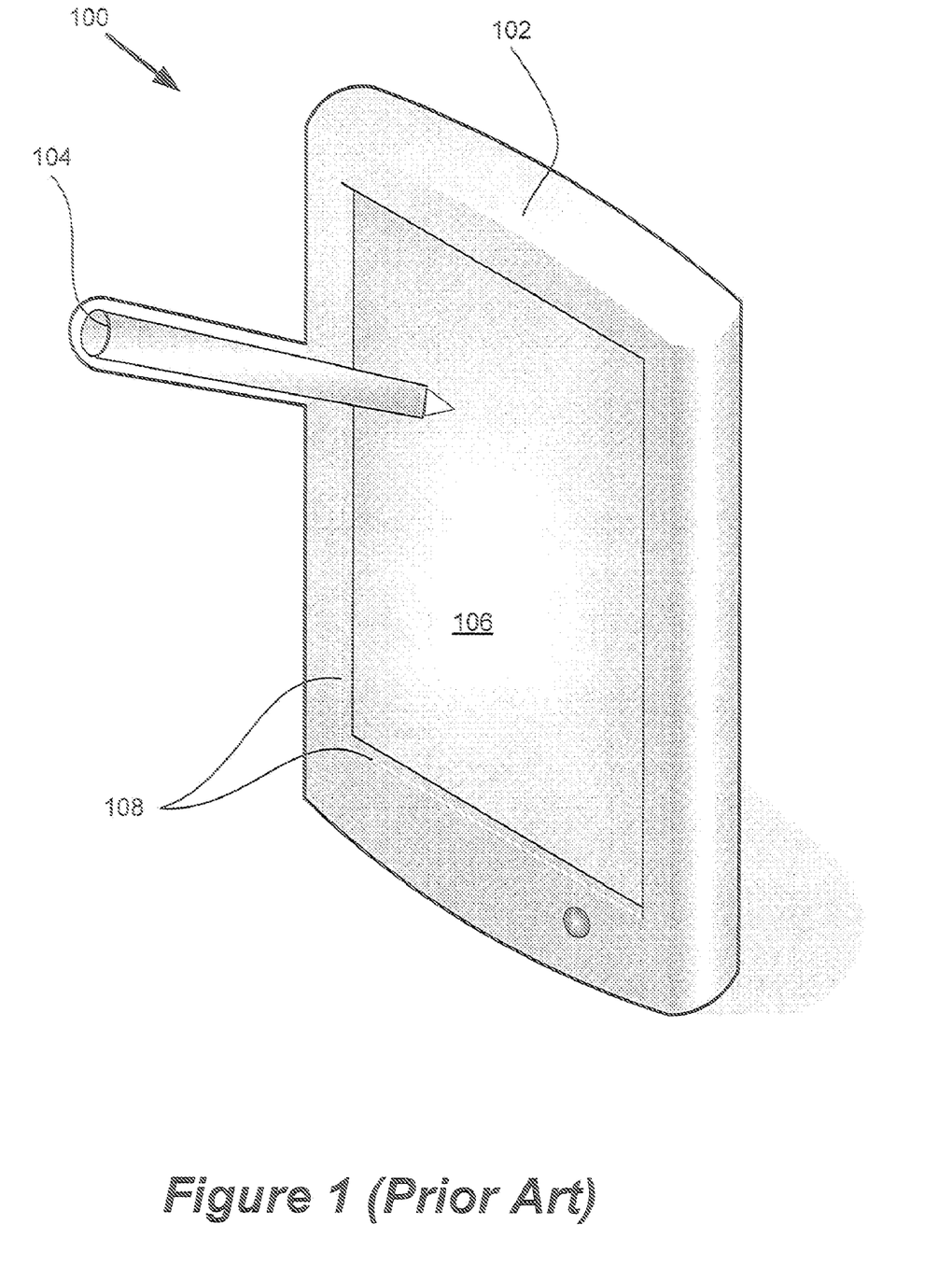
FIG. 1 is a diagram of a prior art LCD panel as an input/output device.

The use and proliferation of portable computing devices has become widespread. In particular, there are a number of small computing devices such as personal digital assistants (PDAs), smart phones, tablet computers, digital cameras, video games and laptop computers that include combined input/output devices. These input/output devices allow the user to interact with the device using a pen or stylus and provide a display for presenting information and input command selections. For example, a prior art system 100 including a pen or stylus 104 and a computing device 102 is shown in FIG. 1. The computing device 102 comprises a touch panel of a conventional type that has a display 106 and a touch sensitive input 108. However, one particular problem for such devices is that the display is typically an active matrix liquid crystal display (LCD), and LCD requires a significant amount of power because the state of each pixel in the display must be maintained by the continuous application of power. Furthermore, much additional power is used to drive backlighting for the LCD panel. Since the devices are often portable, power consumption is a concern and a significant drawback for current devices.

Figure 2:
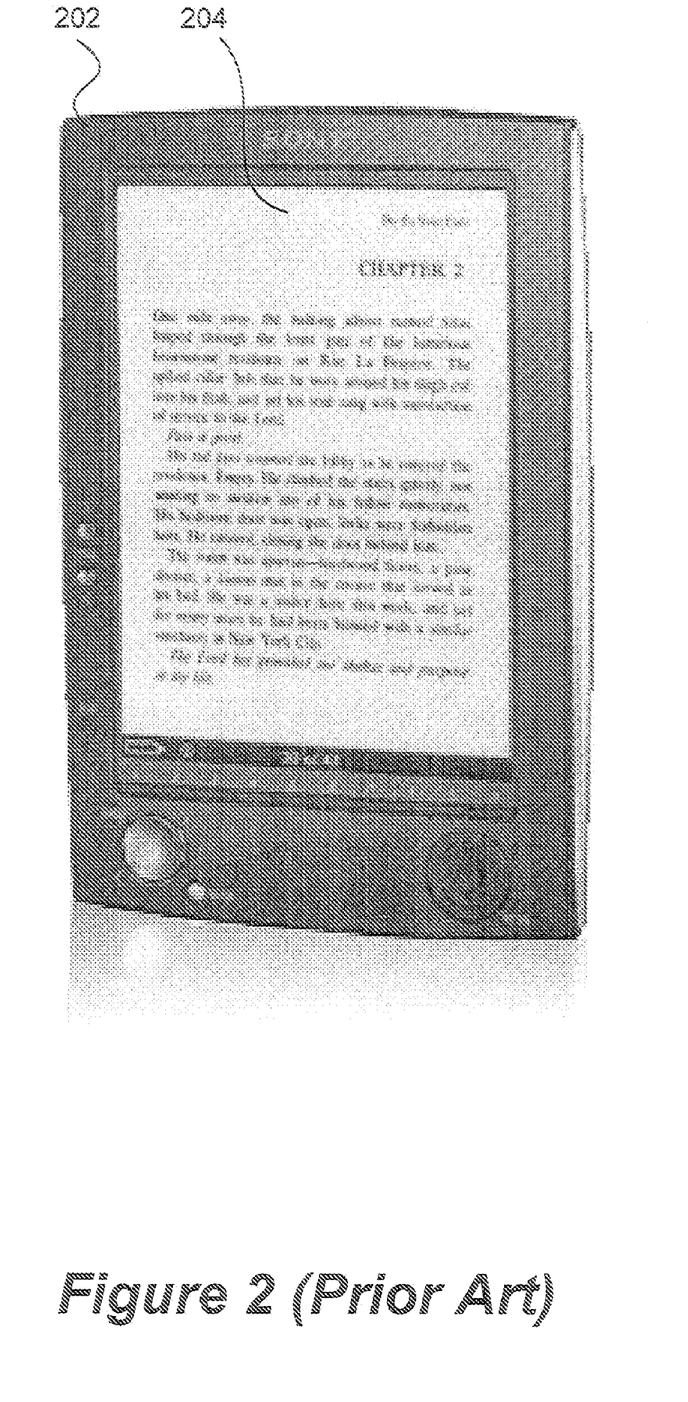
FIG. 2 is a diagram of a prior art paper-like display device.

The have been attempts in the prior art to solve power consumption limitations of the prior art with electrophoretic displays, sometimes referred to as electronic paper or electronic ink. Electrophoretic displays have the advantage that an image drawn on such a display is preserved even when the power is removed. Unlike a conventional flat panel display that uses a backlight to illuminate its pixels, electrophoretic displays reflect light like ordinary paper and are capable of holding text and images without drawing electricity or using processor power. Such technology is very popular for electronic books because power is only required to turn a page, not while reading the text on the page. For example, FIG. 2 shows a device 202 with such a paper-like display 204. Electrophoretic displays are typically monochrome. Adding a color filter to the electrophoretic display significantly reduces the contrast and resolution of the display. Another problem with electronic paper or electronic ink or other zero-power display technologies is that the display cannot be updated very rapidly and cannot support motion video rates. Many display modes require the entire display to be refreshed and this takes a long time, thereby limiting the refresh rate to less than one frame per second. It is important to note that interactive user interfaces on computers must be responsive to user requests and delays of more than a second makes the computer seem sluggish and unresponsive and in some ways unusable.

SUMMARY OF THE INVENTION

The present invention overcomes the deficiencies of the prior art with an additional display layer, for instance, a layer that provides high frame-rate display output or color when active, but allows the electrophoretic display to show through when power is removed from the additional layer. The additional layer is particularly advantageous because it combines the low-power advantages of electrophoretic displays with the high-frame rate or color advantages of a typical LED or LCD display. In one embodiment, the system of the present invention includes: a first display layer, a second display layer, an input layer and control logic. The first display layer is a low power display like an electrophoretic display. The second display layer is a fast, transparent display or a color display positioned on top of the electrophoretic display. The input layer is a layer for detecting input movements or gestures by the user. In one embodiment, the input layer can be transparent, like a touchscreen, and is placed above the two display layers. In one embodiment, the input layer works through the display layers, like a Wacom brand tablet and can be placed below both layers. In one embodiment, the touch-sensing technology is supplied along the edge of the display and requires no physical layer, like surface acoustic wave or SAW technology. The control logic is coupled to the first display layer, the second display layer and the input layer for controlling their operation according the method of the present invention. The method of the present invention selectively operates the second display layer to present images that must change rapidly, including video images or movement driven by user input.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

A multilayer input/output device and a method for displaying information are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to an embodiment of a display for a portable computing device, but the invention is applicable to any computing device that needs a display, and where power conservation is important.

Reference in the specification to "one embodiment," "an embodiment" or "the embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Multi-Layer Display

Figure 3:
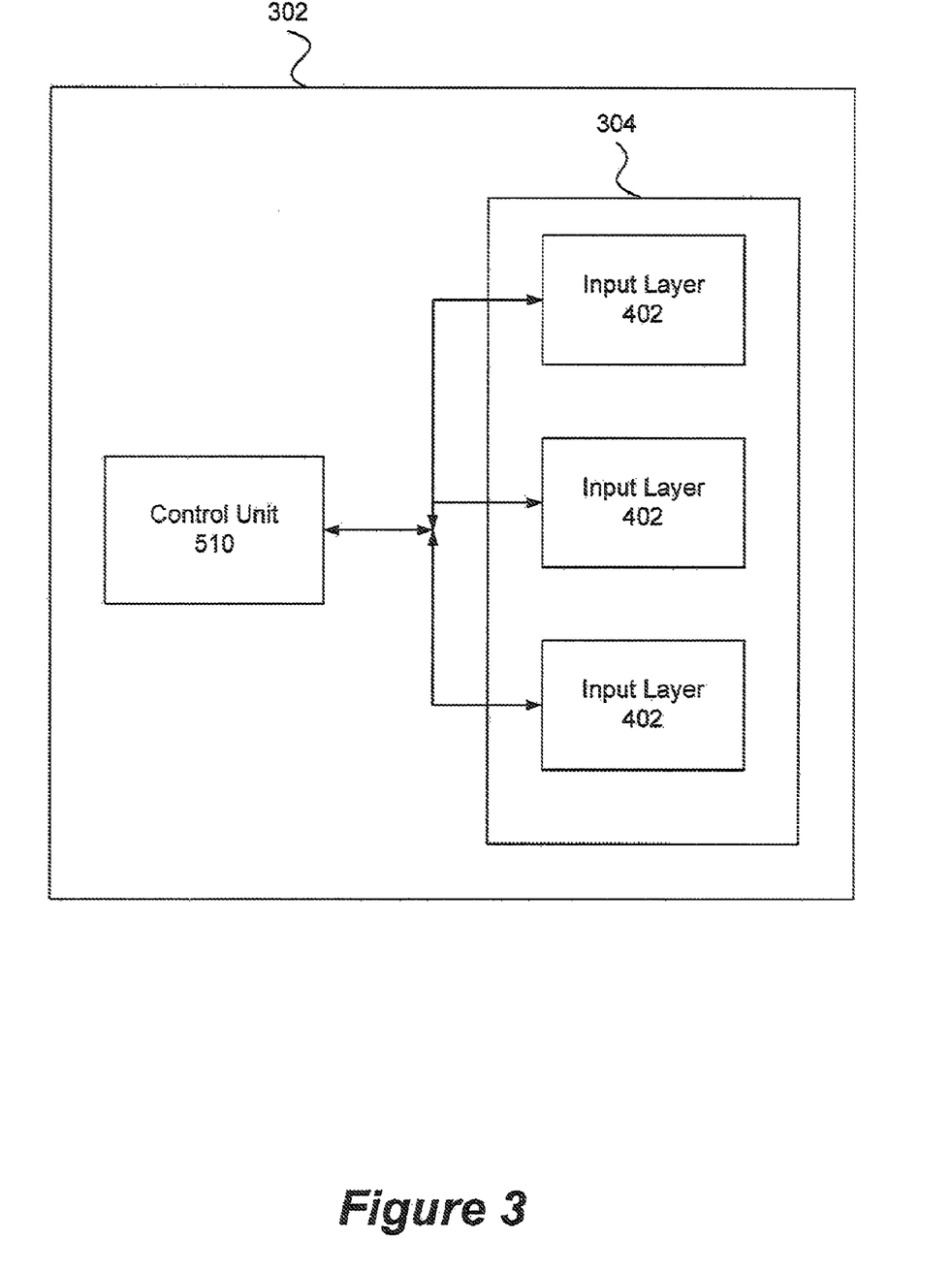
FIG. 3 illustrates a block diagram of an embodiment of the multiple layer input/output device in accordance with the present invention.

Referring now to FIG. 3, an embodiment of an apparatus 302 including one embodiment of the multiple layer input/output device 304 of the present invention is shown. In this example embodiment, the apparatus 302 is a portable computing unit such as a tablet personal computer. FIG. 3 shows a block diagram of the apparatus 302 with an outer housing holding and enclosing the multi-layer display 304.

While the present invention will now be described in the context of tablet computing system 302, this embodiment is used only for illustration purposes and the computing system may be any computing device including but not limited to a mobile phone, a PDA, a gaming device, a camera and a portable video player. Moreover, the while the present invention will be described as an input/output device, those skilled in the art will recognize that the present invention may be only a display device cooperating with some other non-integrated input device such as a mouse-type controller.

Although not shown in FIG. 3, those skilled in the art will recognize that in different embodiments, the apparatus 302 includes one or more of the following: a control unit 510, memory, a cache, data storage, one or more other input/output (I/O) devices, a wireless transceiver, a infrared transceiver, and a network controller. These components are coupled together in a conventional manner such as in a von Neumann architecture or similar architectures as will be understood to those skilled in the art to provide the basic functionality of the device as a cell phone, PDA or smart phone.

Figure 4:
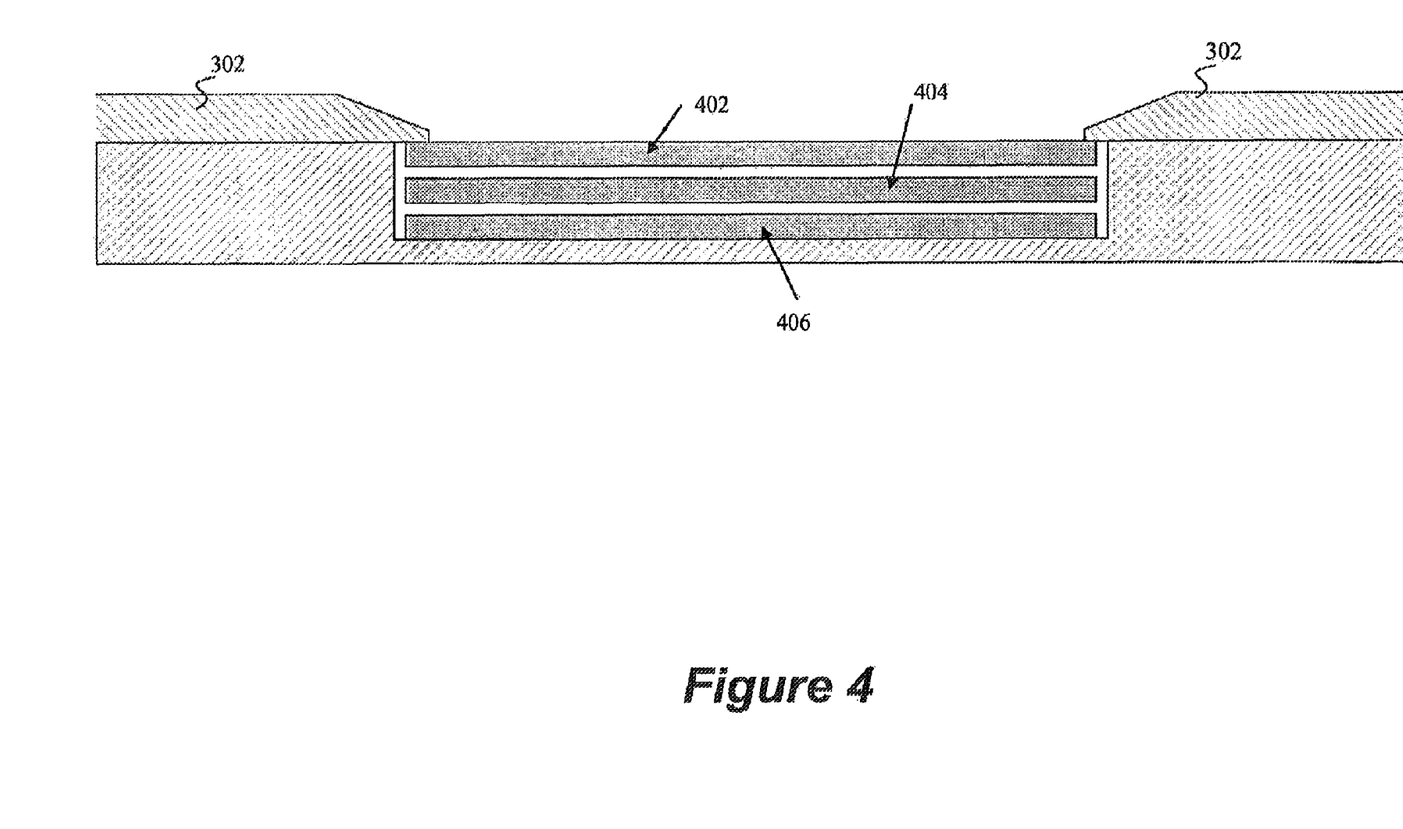
FIG. 4 illustrates a diagram, partially in cross section of the embodiment of the multiple layer input/output device in accordance the present invention.

Referring now also to FIG. 4, the multiple layer input/output device 304 is shown as comprising a first display layer 406, a second display layer 404 and an input layer 402. FIG. 4 illustrates the multiple layer input/output device 304 partially in cross section. The input/output device 304 is particularly advantageous because it provides a multilayer input/output device 304 with a low power and a high resolution display suitable for use in paper-like computing. As shown in FIG. 4, in one embodiment the input layer 402 is positioned on top of the second display 404 and closest to the top surface of the apparatus 302. The second display layer 404 is positioned immediately below the input layer 402 between it and the first display layer 406. In an alternate embodiment, the input layer 402 could be below both the second display layer 404 and the first display layer 406. More specifically, any layers above the first layer must be transparent when power is not applied.

The first display layer 406 is a low power display. The first display layer 406 is capable of displaying information in response to a signal, and has a top side where information is displayed. The first display layer 406 is preferably a low or zero power, electrophoretic display. In one embodiment, the first layer 406 is an electronic paper display or electrophoretic displays (EPDs) manufactured and sold by E Ink Corporation of Cambridge, Mass. Electronic paper reflects light like ordinary paper and is capable of holding text and images indefinitely without drawing electricity or using processor power-only requiring power to change the image on the display.

In one embodiment, the second display layer 404 is a fast display positioned on top of the first layer. The second display layer 404 is transparent in the power-off state so that when it is positioned over the first layer 406, the information on the first layer 406 can be seen. The second display layer 404 can be made of any material that is normally transparent in the power-off state but where individual pixels can be made dark or bright in the power-on state. The second display layer 404 allows instantaneous updating of the digital ink image. The second display layer 404 is quickly updatable so that it can provide immediate feedback as the input gestures and movements are detected by the input layer 402. In one embodiment, the second display layer 404 can display color images. In one embodiment the second display layer 404 can display rapidly changing images, like video. One example of that type of panel is electrochromic glass which darkens when electricity is applied, but is transparent otherwise. In one embodiment, the second layer 404 is an electrochromic display manufactured and sold by Acreo of Kista, Sweden. In another embodiment, the second layer 404 is a transparent organic light emitting diode (OLED) display such as under development by Fraunhofer IPMS of Munich, Germany. Such transparent OLED's can be selectively illuminated very quickly to reflect the motion of the pen or stylus over the input layer 402.

In an alternate embodiment, the second layer 404 is a layer of transparent material that is pressure sensitive such that it changes color or becomes opaque in response to pressure. In this embodiment, the material that forms the second layer 404 may not require any power, and need only change color or become opaque for a few seconds to allow pen movement to be detected by the input layer 402 and displayed by the first layer 406. The only requirement for this alternate embodiment of the second layer 404 is that it be opaque or colored for sufficient time for the updating of the first layer 406 to occur. Thus, the second layer 404 continues to provide the function of providing immediate feedback to the user of pen movements and need not be powered, or under the control of the control unit 510.

The input layer 402 is a layer for detecting input movements or gestures by the user. In one embodiment, the input layer 402 is a touch-sensitive panel. For example, the input layer 402 can be a touch sensor such as a 5-wire resistive sensor. The input layer 402 may be any touch-sensitive panel whether it use resistive, capacitive or surface wave technology. Thus, the invention has the advantage of low-power requirements, but still provides quick visual feedback for manual selection or pen input.

Figure 5:
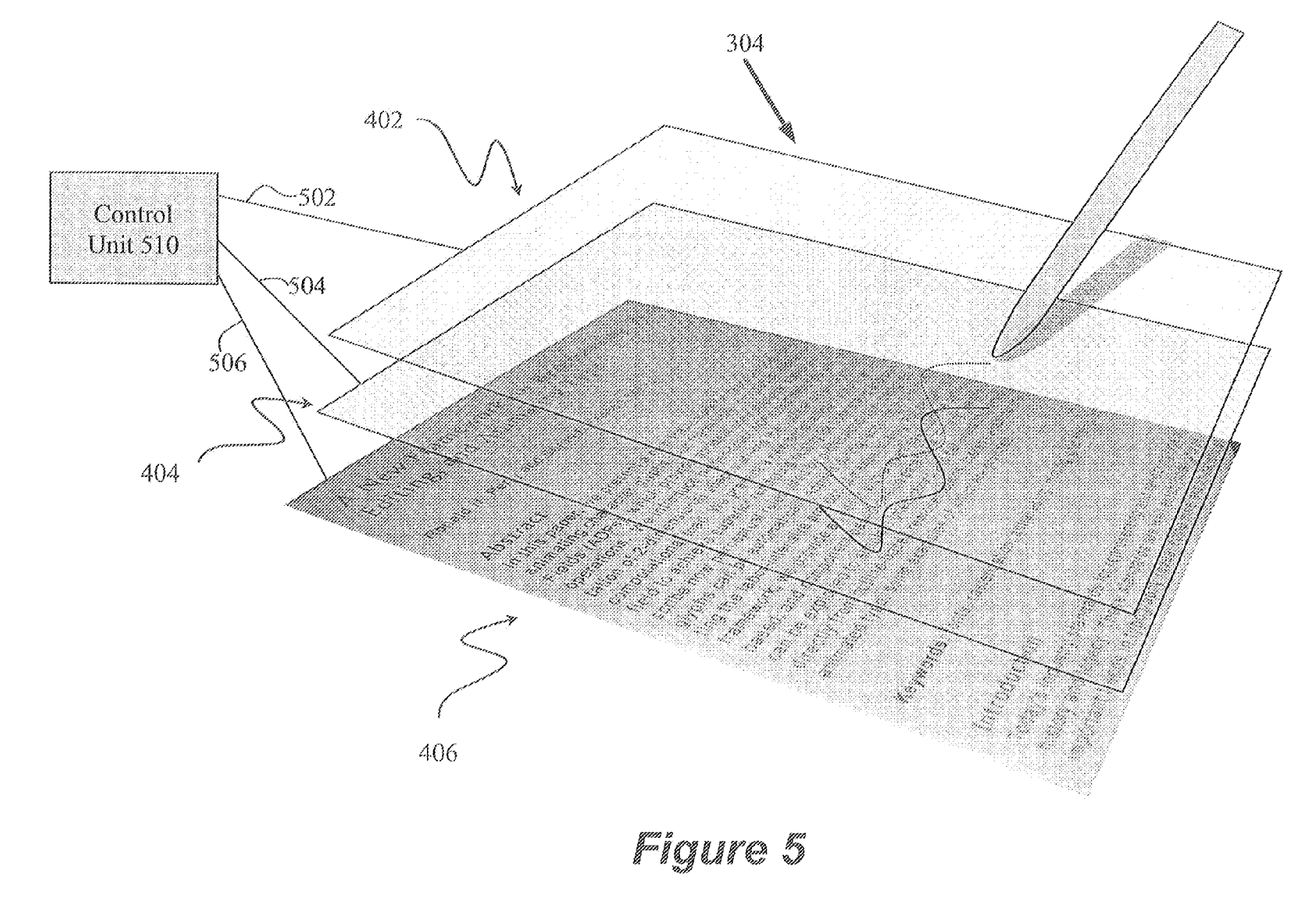
FIG. 5 illustrates an exploded block diagram of the embodiment of the multiple layer input/output device in accordance the present invention.

Referring now to FIG. 5, an exploded, perspective block diagram of the embodiment of the multiple layer input/output device 304 in accordance with the present invention is shown. FIG. 5 again shows the order of the layers 402, 404 and 406 relative to the point of view of the user with the second display layer 404 being positioned between the input layer 402 and the first display layer 406. FIG. 5 also illustrates the coupling of each layer 402, 404 and 406 to the control unit 510. The control unit 510 is coupled by signal line 502 to the input layer 402 to receive signals generated by the input layer 402. The control unit 510 is coupled by single line 504 to the second display layer 404 to selectively activate for operation and to send data for display to the second display layer 404. Finally, the control unit 510 is coupled by signal line 506 to the first display layer 406 to send information and updating commands.

The control unit 510 comprises an arithmetic logic unit, a microprocessor, a general purpose computer or some other processor equipped to receive input from the input layer 402 and other sources and provide electronic display signals to first layer 406 and the second display layer 404. In one embodiment, control unit 510 comprises a general purpose computer having a graphical user interface, which may be generated by, for example, a program written in Java running on top of an operating system like WINDOWS® or UNIX® based operating systems. In one embodiment, one or more application programs are executed by control unit 510 including, without limitation, word processing applications, electronic mail applications, financial applications and web browser applications.

The control unit 510 is coupled to the first display layer 406, the second display layer 404 and the input layer 402 for controlling their operation according the method of the present invention. In one embodiment, the method of the present invention selectively operates the second display layer 404 to present movement detected by the input layer. At a predetermined time, the information presented on the second display is transferred to and presented on the first display. For example, the initial page appears on the first display layer 406. A pen or stylus is applied to the input layer 402 and the pen motion is measured using the touch sensor of the input layer 402. The motion is recorded by the control unit 510 and the "digital ink" captured from the motion is displayed on the second display layer 404 as it is recorded. Individual pixels of the transparent second layer 404 can be turned on as the pen passes over them. After the pen input is complete and the pen is removed from the apparatus 302, the image of the pen motion can be transferred from the second display layer 404 to the first display layer 402, and the second display layer 404 can be inactivated. The first layer 406 requires very little power compared to other types of displays and the second layer 404 provides immediate feedback to the pen holder but without the continuous power requirements of existing conventional displays.

Methods

Figure 6A:
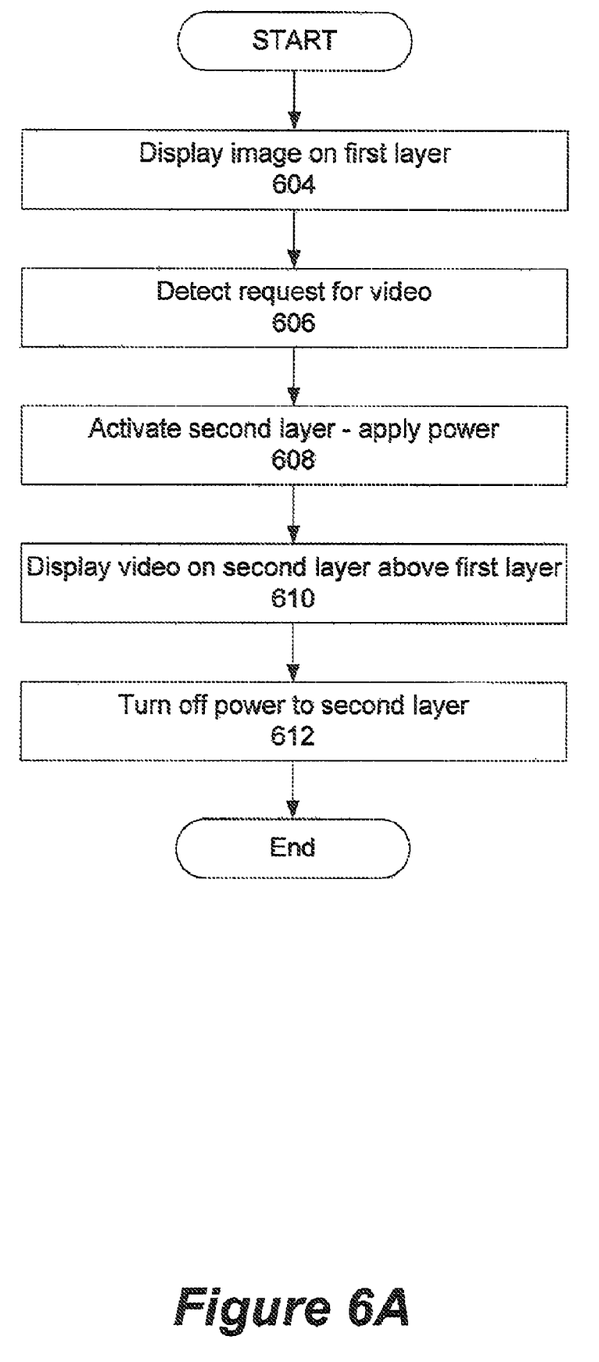
FIGS. 6A-6C illustrate flowcharts of embodiments for displaying information with a multiple layer input/output device in accordance the present invention.

Referring now to FIG. 6A, an embodiment of a method for displaying video on a paper-like display is shown. In step 604, a static image is shown on the first electrophoretic display layer 406. A request for video or motion image is received 606. At step 608, the second layer 404 is activated or provided with power. At step 610, the video or sequence of images are displayed on the second layer 404 above the first layer 406. At step 612, when the video has completed, the second layer 404 is deactivated or turned off and becomes transparent again.

Figure 6B:
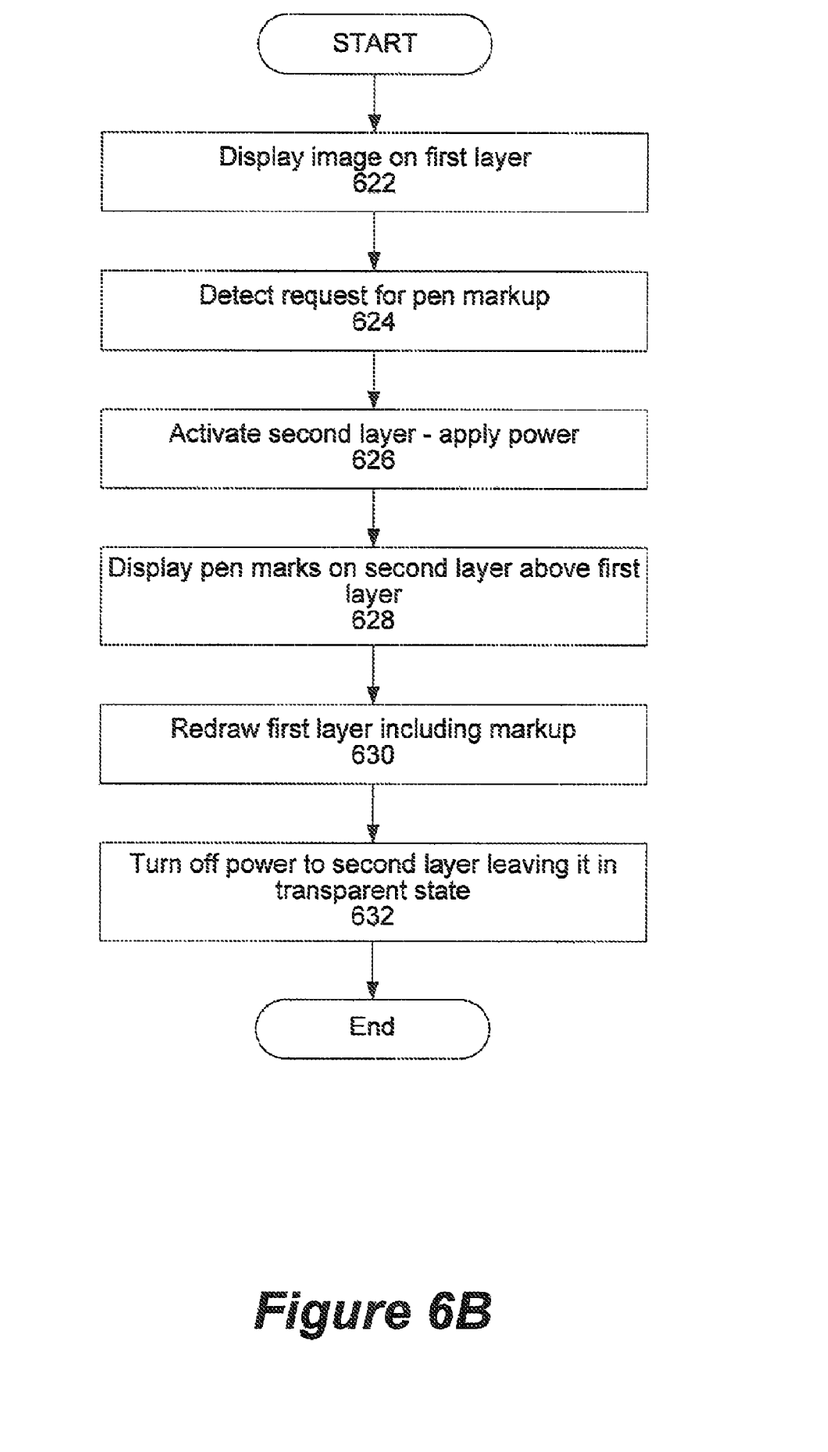

Referring now to FIG. 6B, an embodiment of a method for displaying information on the multiple layer input/output device 304 in accordance with the present invention is shown. The method begins by displaying 622 information on the first display layer 406. Then the method detects 624 a pen input such as a pen down event. The method continues to detect 624 the movement of the pen. This is received as input by the input layer 402 and sent to the control unit 510. Based on this input, the method activates 626 the second display layer 404 and displays 628 "digital ink" representing the input to provide feedback to the user as to the movement of the pen or stylus on the input/output device 302. Although step 628 is shown as a single step, those skilled in the art will recognize that individual pixels of the second display layer 404 can be modified as to their display state in response to additional movement of the pen as it is detected by the input layer 402. Since the second display layer 404 has a very fast updating speed and can update individual pixels, the display mimics writing on paper. The method then detects a pen up event. In an alternate embodiment, the pen up event can be replaced by a predetermined amount of time such as few seconds, or another time match to the updating time of the first display layer 406. After the pen up event has been detected, the method begins to display 630 the "digital ink" on the first display layer 406. The method continues 632 by removing the digitally ink on the second layer 404 and deactivating it.

Figure 6C:
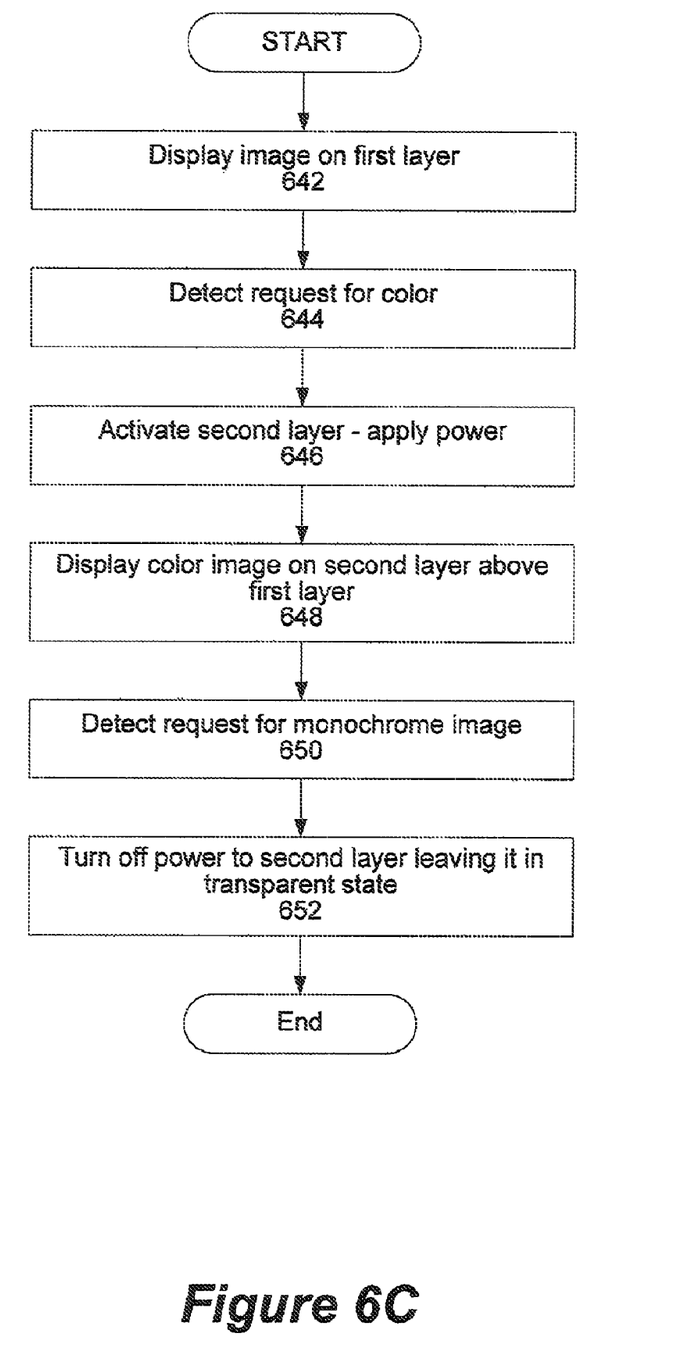

Referring now to FIG. 6C, an embodiment for displaying color images on a low power display is shown. In step 642, a static image is displayed on the first layer 406. In step 644, a request is received to display a color image on the second layer display 404. The second layer 404 is activated 646 and the color image is displayed 648 on the second layer 404. When the color image is no longer needed or a monochrome image is requested 650 the second display layer 404 is deactivated or power is removed 652 and the monochrome display 406 is seen through the transparent color layer 404.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Accordingly, the disclosure of the present invention is intended to be illustrative, but not limiting, of the scope of the present invention, which is set forth in the following claims.

The invention claimed is:

1. A multi-layer display device for displaying information, the multi-layer display device comprising:
    a first layer of the multi-layer display device including a low power display capable of displaying visual information in response to a first signal, the first layer having a top side where visual information is displayed;
    a second layer of the multi-layer display device coupled to the first layer, the second layer for displaying visual information in response to a second signal, the second layer being selectively transparent, the second layer positioned on the top of the first layer, the second layer having a different display characteristic and being made of a different material from the first layer; and
    a control unit coupled to the first layer and the second layer, the control unit for transferring visual information corresponding to an input displayed on the second layer to the first layer.

2. The multi-layer display device of claim 1, wherein the first layer is a low power paper-like display.

3. The multi-layer display device of claim 1, wherein the first layer is an electronic paper display.

4. The multi-layer display device of claim 1, wherein the second layer is a material that is normally transparent in a power-off state but where individual pixels can be made dark in a power-on state.

5. The multi-layer display device of claim 1, wherein the second layer is quickly updatable for instantaneous presentation of a digital ink image to provide immediate feedback in response to pen-based input.

6. The multi-layer display device of claim 1, wherein the second layer is an electrochromic display.

7. The multi-layer display device of claim 1, wherein the second layer is a transparent organic light emitting diode (OLED) display.

8. The multi-layer display device of claim 1, further comprising an input layer for detecting movement and generating an input signal.

9. The multi-layer display device of claim 8, wherein the input layer is positioned above the second layer.

10. The multi-layer display device of claim 8, wherein the input layer is a touch-sensitive panel.

11. The multi-layer display device of claim 1, wherein the control unit controls the operation of the first layer and the second layer, the control unit coupled to the first layer and the second layer to provide the first signal and the second signal.

12. The multi-layer display device of claim 10, wherein the control unit receives the input signal from the input layer and outputs the first signal for controlling display of information by the first layer and the second signal for selectively activating the second layer, the control unit coupled to the first layer, the second layer and the input layer.

13. The multi-layer display device of claim 12, wherein the control unit also transfers information being displayed on the first layer to being displayed on the second layer.

14. The multi-layer display device of claim 1, wherein the different display characteristic of the second layer is that of being rapidly updated.

15. The multi-layer display device of claim 1, wherein the different display characteristic of the second layer is being able to display color.

16. A method for displaying information on a multi-layer display device, the method comprising:
    receiving an input;
    temporarily the visual information corresponding to the input displayed on a second display layer of the multi-layer display device, the second display layer being selectively transparent;
    transferring, with a control unit, the visual information corresponding to the input displayed on the second display layer to a first display layer of the multi-layer display device that is positioned below the second display layer, the first display layer having a top side where visual information is displayed and that includes a low power display; and
    wherein the first display layer is made of a different material and has a different display characteristic than the second display layer.

17. The method of claim 16, wherein the step of temporarily displaying information is performed until the information corresponding to the input is displayed on the first display layer of the multi-layer display device.

18. The method of claim 16, wherein the step of temporarily displaying information is performed for a predetermined amount of time.

19. The method of claim 16, wherein the step of temporarily displaying information is performed until a touch sensitive panel has not been touched for a predetermined amount of time.

20. The method of claim 16, wherein the input is digital ink and the step of temporarily displaying information is performed until the digital ink has been transferred from the second layer of the multi-layer display device to the first layer of the multi-layer display device.

21. The method of claim 16, further comprising deactivating the second layer of the multi-layer display device.

22. The method of claim 16, further comprising displaying other information on the first display layer of the multi-layer display device prior to the step of receiving input.

* * * * *